US011234163B1

United States Patent
Ho

(10) Patent No.: US 11,234,163 B1
(45) Date of Patent: Jan. 25, 2022

(54) DYNAMIC ECPRI HEADER COMPRESSION

(71) Applicant: NOKIA SOLUTIONS AND NETWORKS OY, Espoo (FI)

(72) Inventor: Honore Ho, Bourg-la-Reine (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/362,482

(22) Filed: Jun. 29, 2021

(30) Foreign Application Priority Data

Sep. 18, 2020 (FI) .................................... 20205906

(51) Int. Cl.
*H04W 52/02* (2009.01)
*H04W 28/06* (2009.01)

(52) U.S. Cl.
CPC .................. *H04W 28/06* (2013.01)

(58) Field of Classification Search
CPC ....... H04L 5/0003; H04L 45/74; H04L 69/16; H04L 69/326; H04W 52/0248; H04W 28/065; H04W 52/0229; H04W 52/0206
See application file for complete search history.

(56) References Cited

U.S. PATENT DOCUMENTS

| 2019/0289497 | A1  | 9/2019  | Rajagopal |             |
|--------------|-----|---------|-----------|-------------|
| 2019/0387471 | A1* | 12/2019 | Salmela   | H04W 52/0229 |
| 2020/0092229 | A1* | 3/2020  | Levi      | H04L 49/9068 |
| 2020/0113016 | A1  | 4/2020  | Sevindik  |             |
| 2020/0235905 | A1* | 7/2020  | Su        | H04J 3/1652 |
| 2021/0037421 | A1* | 2/2021  | Allan     | H04W 28/0958 |
| 2021/0120527 | A1* | 4/2021  | Rhim      | H04L 5/0091 |
| 2021/0195632 | A1* | 6/2021  | Jungnickel| H04B 10/116 |
| 2021/0243797 | A1* | 8/2021  | Reddy     | H04W 36/0033 |
| 2021/0266870 | A1* | 8/2021  | Bhandari  | H04W 72/04  |

FOREIGN PATENT DOCUMENTS

| CN | 111490799 A    | 8/2020  |
| EP | 3582558 A1     | 12/2019 |
| WO | WO 2020/151800 A1 | 7/2020 |

OTHER PUBLICATIONS

Office Action and Search Report dated Dec. 17, 2020 corresponding to Finnish Patent Application No. 20205906.
Communication of Acceptance under section 29a of Patents Decree dated Jun. 3, 2021 corresponding to Finnish Patent Application No. 20205906.
Ericsson AB et al., eCPRI Specification V2.0 (May 10, 2019). Interface Specification. Common Public Radio Interface: eCPRI Interface Specification, May 10, 2019.

* cited by examiner

*Primary Examiner* — Syed Ali
(74) *Attorney, Agent, or Firm* — Squire Patton Boggs (US) LLP

(57) ABSTRACT

According to an aspect, there is provided a first apparatus for performing the following. The first apparatus transmits a first protocol data unit, PDU, using enhanced common public radio interface, eCPRI, to a second apparatus. The first PDU comprises a first header and, as payload, at least a first label for the first header. Said first label comprises at least a compressed eCPRI header. Following the transmitting of the first PDU, the first apparatus transmits a second PDU without a header using eCPRI to the second apparatus. The second PDU corresponds to the first header and comprises a second label comprising at least said eCPRI header for enabling accessing of the first header locally by the second apparatus.

18 Claims, 10 Drawing Sheets

| bits→ bytes ↓ | 0 | 1 | 2 | 3 | 4 | 5 | 6 | 7 |
|---|---|---|---|---|---|---|---|---|
| | MSB | | | | | | | LSB |
| 1 | L2 comp | L3 comp=no | VLAN stack [2:0] | | | protocol [2:0] | | |
| 2 | eCPRI comp | learn | MAC label [5:0] | | | | | |
| 3 | eCPRI C bit | learn | msg_type [2:0] | | | PC_ID [2:0] | | |

| bits→ bytes ↓ | 0 | 1 | 2 | 3 | 4 | 5 | 6 | 7 |
|---|---|---|---|---|---|---|---|---|
| 1 | L2 comp | L3 comp = yes | VLAN stack [2:0] | | | Protocol [2:0] | | |
| 2 | UDP comp | learn | MAC label [5:0] | | | | | |
| 3 | IP version | learn | IP label [5:0] | | | | | |
| 4 | eCPRI comp | learn | UDP source port [2:0] | | | UDP dest port [2:0] | | |
| 5 | eCPRI C bit | learn | msg_type [2:0] | | | PC_ID [2:0] | | |

DYNAMIC ECPRI HEADER COMPRESSION

TECHNICAL FIELD

Various example embodiments relate to wireless communications.

BACKGROUND

Common Public Radio Interface (CPRI) standard defines an interface between Radio Equipment Control (REC) and Radio Equipment (RE). In practice, CPRI is used for implementing fronthaul links between cell sites (i.e., central radio transceivers typically located in a tower) and base stations (sometimes called remote radio units, RRUs, or remote radio heads, RRHs) in cellular wireless networks (e.g., 4G networks). CPRI is a serial interface implemented usually with optical fiber. As considerably more stringent demands (e.g., in terms of bandwidth) are placed on the fronthaul link in 5G networks compared to 4G networks, a new solution for backhauling is needed to meet these demands. Enhanced CPRI (eCPRI) is a more advanced, improved version of the conventional CPRI envisioned to be employed in connection with 5G networks. In general, eCPRI is defined in ERICSSON AB. et al. eCPRI Specification V2.0 (2019 May 2010), Interface Specification, Common Public Radio Interface: eCPRI Interface Specification. In eCPRI, the baseband functions split up and some of those functionalities are implemented in the RRU in order to reduce the burden on the fronthaul connection. However, further improvements to eCPRI operation would still be welcome to further optimize the performance of the 5G network.

CN 111490799 A discloses a method and device for information transmission. The method includes: obtaining a transmission frame/first transmission packet from a fronthaul interface, wherein the transmission frame/first transmission packet includes control parameters and neural network transmission parameters, The neural network transmission parameters are used to indicate transmission status and attributes of data information; according to the control parameters and the neural network transmission parameters, data information in the transmission frame/second transmission packet is acquired.

BRIEF DESCRIPTION

According to an aspect, there is provided the subject matter of the independent claims. Embodiments are defined in the dependent claims. The scope of protection sought for various embodiments is set out by the independent claims.

According to a further aspect, there is provided a first apparatus comprising means for performing:

transmitting a first protocol data unit, PDU, using enhanced common public radio interface, eCPRI, to a second apparatus, wherein the first PDU comprises a first header and, as payload, at least a first label for the first header, said first label comprising at least a compressed eCPRI header; and transmitting, following the transmitting of the first PDU, a second PDU without a header using eCPRI to the second apparatus, wherein the second PDU corresponds to the first header and comprises a second label comprising at least a compressed eCPRI header for enabling accessing of the first header locally by the second apparatus.

According to a further aspect, there is provided a second apparatus comprising means for performing:

receiving a first protocol data unit, PDU, using enhanced common public radio interface, eCPRI, from a first apparatus, wherein the first PDU comprises a first header and, as payload, at least a first label for the first header, said first label comprising at least a compressed eCPRI header;

storing the first header and the first label for the first header to a learning index maintained in a memory;

receiving, following the storing, a second PDU having no header from the first apparatus, wherein the second PDU comprises a second label comprising at least the compressed eCPRI header; and retrieving, in response to the receiving of the second PDU, the first header for the second PDU or a part thereof from the learning index based on the second label.

The embodiments and features, if any, described in this specification that do not fall under the scope of the independent claims may be interpreted as examples useful for understanding various embodiments.

BRIEF DESCRIPTION OF THE DRAWINGS

In the following, some example embodiments will be described with reference to the accompanying drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The term "byte" as used in this application may be considered synonymous with the term "octet". In other words, a byte may be defined as a unit of digital information in computing and telecommunications that consists of eight bits.

Figure 1:
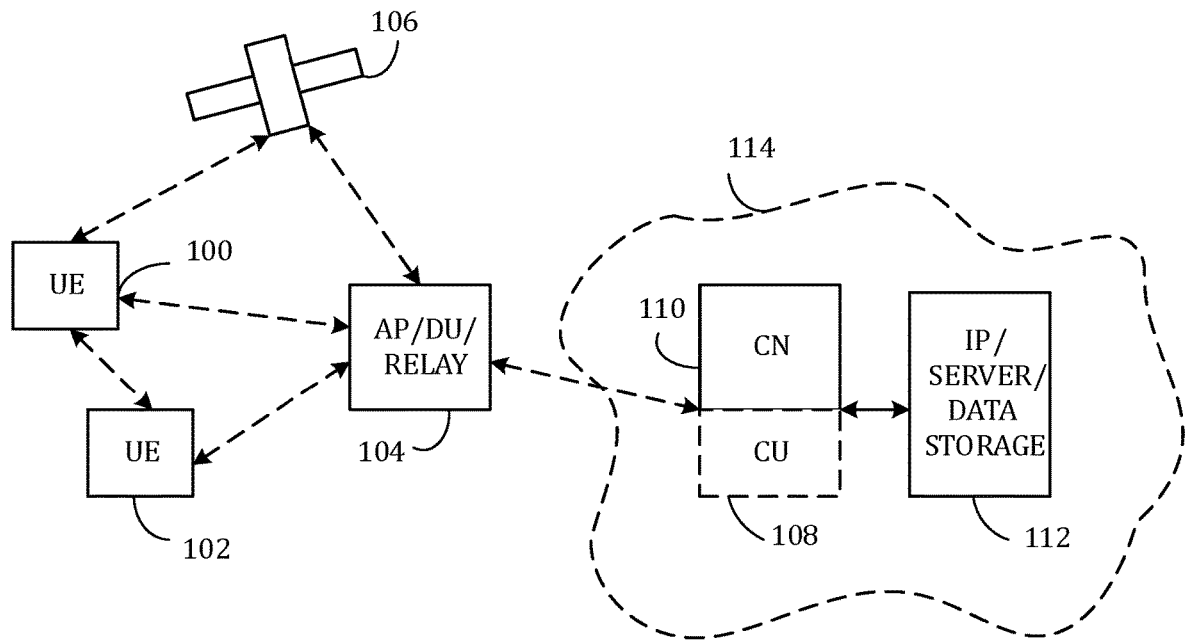
FIGS. 1 and 2 illustrate examples of communications systems to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 (equally called terminal devices) configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal or terminal device) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

5G may also utilize unlicensed spectrum, similar to WLAN or Multefire. 5G operating in unlicensed spectrum is also referred to as NR-U.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
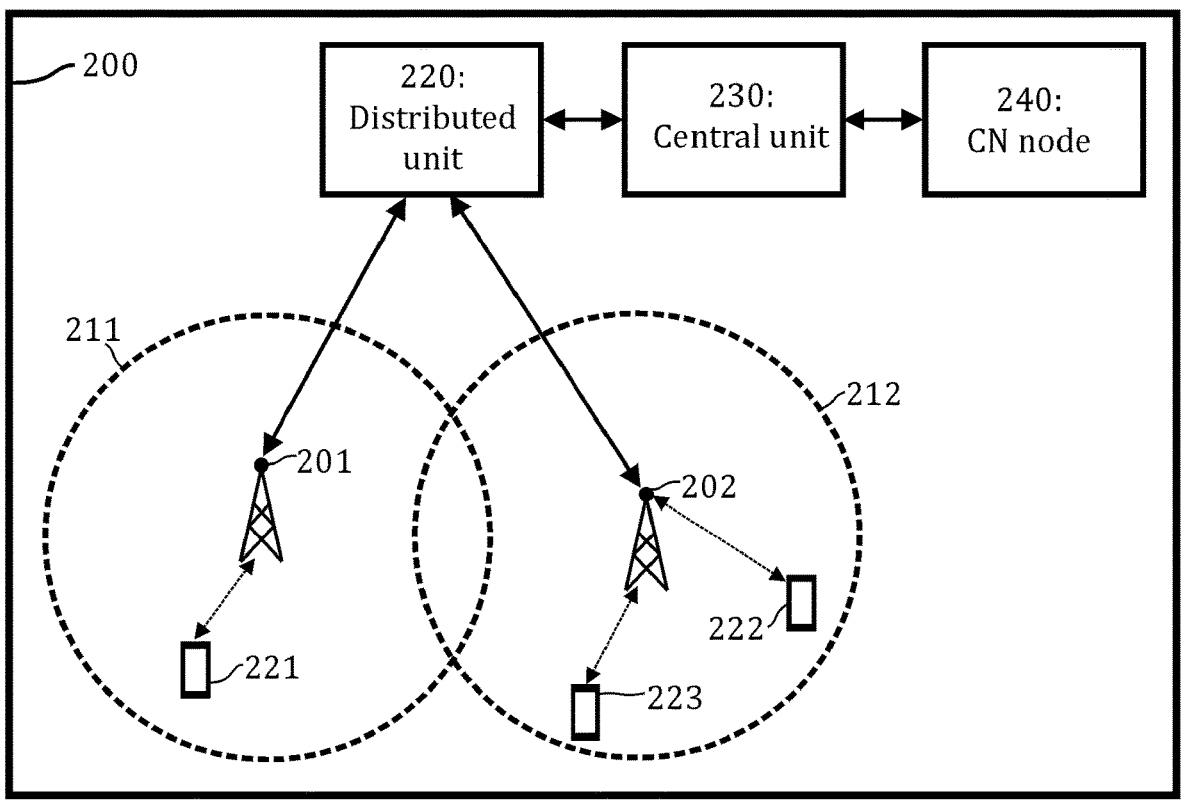

FIG. 2 illustrates another example of a communications system 200 to which some embodiments may be applied. Specifically, the illustrated communications system employs a disaggregated RAN architecture, where the RAN functionalities are distributed between different distinct units forming the RAN. The communications system 200 may correspond the communication system as discussed in relation to FIG. 1 or a part thereof. Therefore, any of the terminal devices 221, 222, 223 may correspond to either of elements 100, 102 of FIG. 1. Moreover, the access node 104 of FIG. 1 may correspond to a combination of the elements 201, 202, 220 forming a distributed access node. The illustrated communications system may be based on New Radio (NR) access technology.

Referring to FIG. 2, the communication system 200 comprises two (remote) radio units or heads 201, 202 providing respective (neighboring) cells 211, 212, a distributed unit 220 connected to at least one of the remote radio units 201, 202 via wired and/or wireless communications links (so-called fronthaul links) and a central unit 230 connected to the distributed unit 220 via a wired or wireless communications link. The central unit 230 may be further connected via wired and/or wireless communications link to one or more core network nodes 240 such as to a session management function (SMF). This connection may be provided via one or more other functions or network entities not shown in FIG. 2 (e.g., via a user plane function, UPF, and/or an access management function, AMF).

At least some of the elements 201, 202, 220, 230 may be associated with the same access node (e.g., the substantially same gNB). At least one remote radio unit 201, 202 may be MIMO-capable (i.e., comprise a MIMO antenna array and associated signal processing means for performing beamforming using said MIMO antenna array). Moreover, the communication system 200 comprises a plurality of terminal devices 221, 222, 223 located within the cells 211, 212. In other embodiments, the number of the remote radio units may be different compared to the illustrated example though to fully benefit from the distributed architecture, the access node should comprise at least two remote radio units. While FIG. 2 illustrates a single distributed unit 220 for simplicity, in other embodiments two or more distributed units 220 connected to the substantially same central unit 230 may be provided.

The communication link between the distributed unit 220 and each of the remote radio units 201, 202 may be called a fronthaul link. Said fronthaul link may be implemented specifically using enhanced Common Public Radio Interface (eCPRI). eCPRI is a more advanced, improved version of the conventional CPRI envisioned to be employed in connection with 5G networks. In eCPRI, the baseband functions are split up and some of those functionalities are implemented in the remote radio unit in order to reduce the burden on the transmission medium (e.g., optical fiber or wireless link). In general, the distributed unit 220 may act as the so-called eCPRI Radio Equipment Control (eREC) and each of the remote radio units may act as the so-called eCPRI Radio Equipment (eRE). Specifically, the fronthaul link may employ one or more of eCPRI over Ethernet, eCPRI over IPv4 and eCPRI over IPv6, as will be discussed in detail below.

Fronthaul eCPRI link may have at least the following characteristics:
  interwork with switched layer-2 (L2) network.
  high bandwidth requirements with physical ethernet link speed at 25 and 10 Gbps,
  high reliability requirement (larger than 99.999%)
  the equipment on fronthaul links have to be stable and have to posses fixed addresses/ports.

In some embodiments, the fronthaul eCPRI links may employ specifically the E-band (60-90 GHz). In practice, the fronthaul link may employ a certain frequency range (or ranges) within the E-band, e.g., 71-76 GHz, 70-80 GHz, 71-86 GHz and/or 81-86 GHz.

Figure 3A:
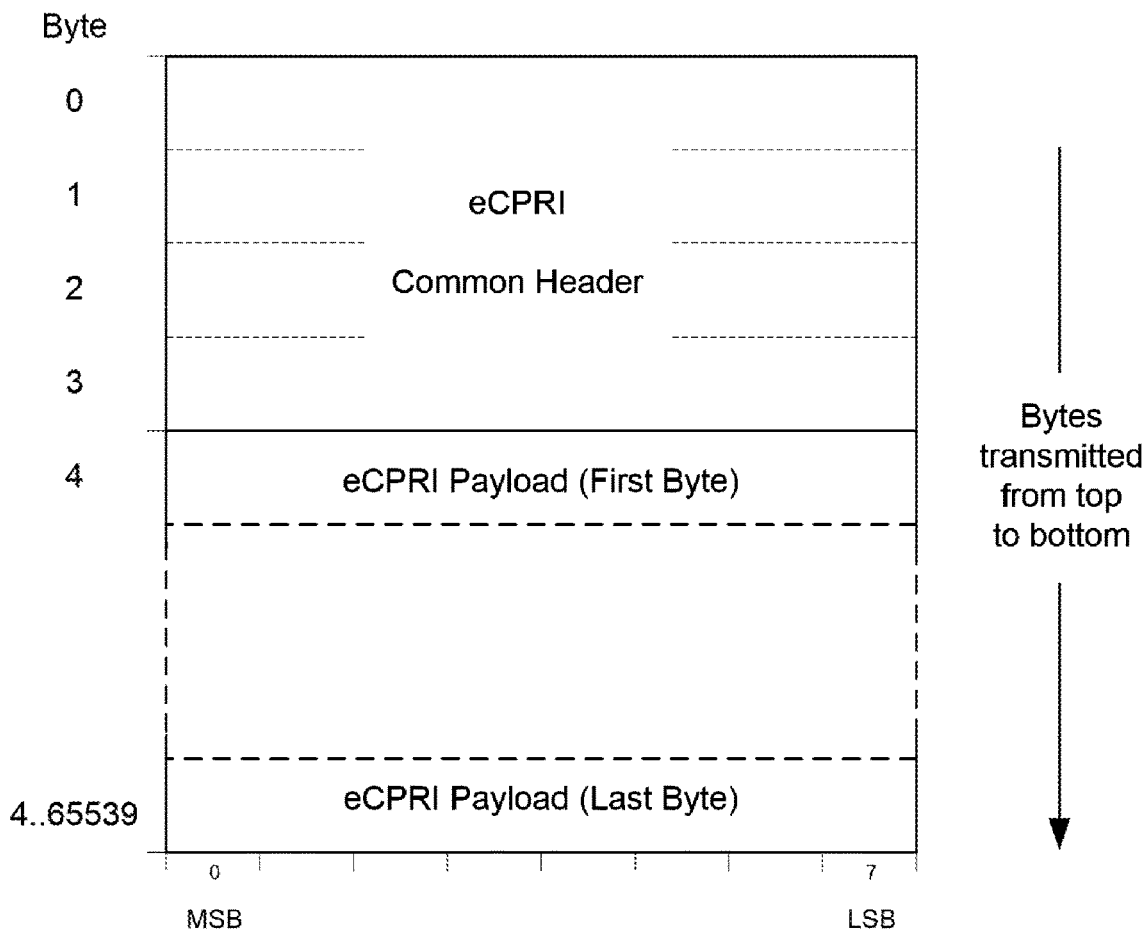
FIGS. 3A, 3B and 3C illustrate the eCPRI message format, the eCPRI common header format and the format for message type 0 defined for eCPRI, respectively.
Figure 3B:
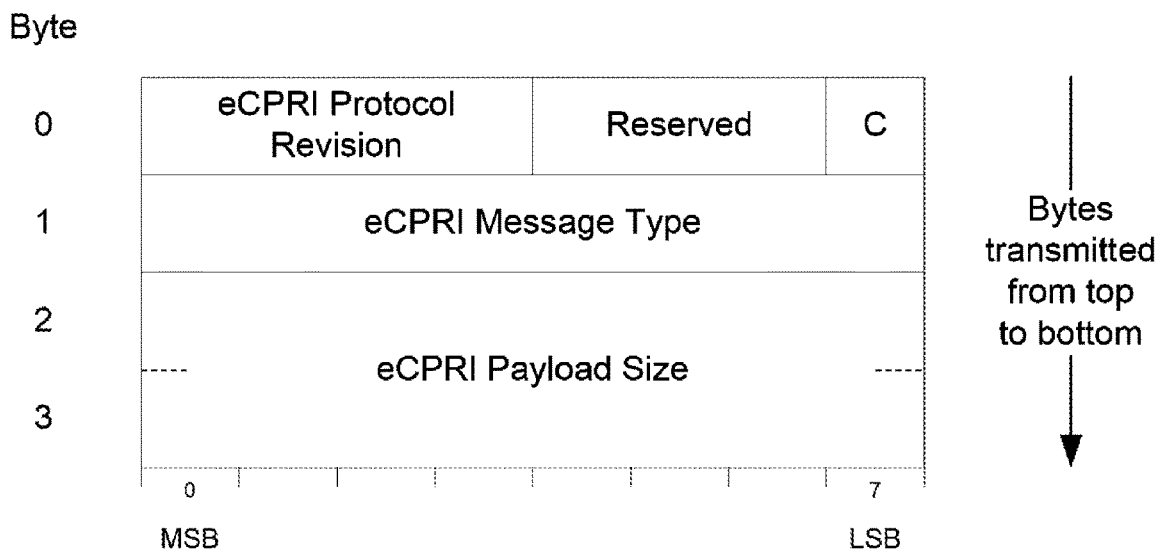
Figure 3C:
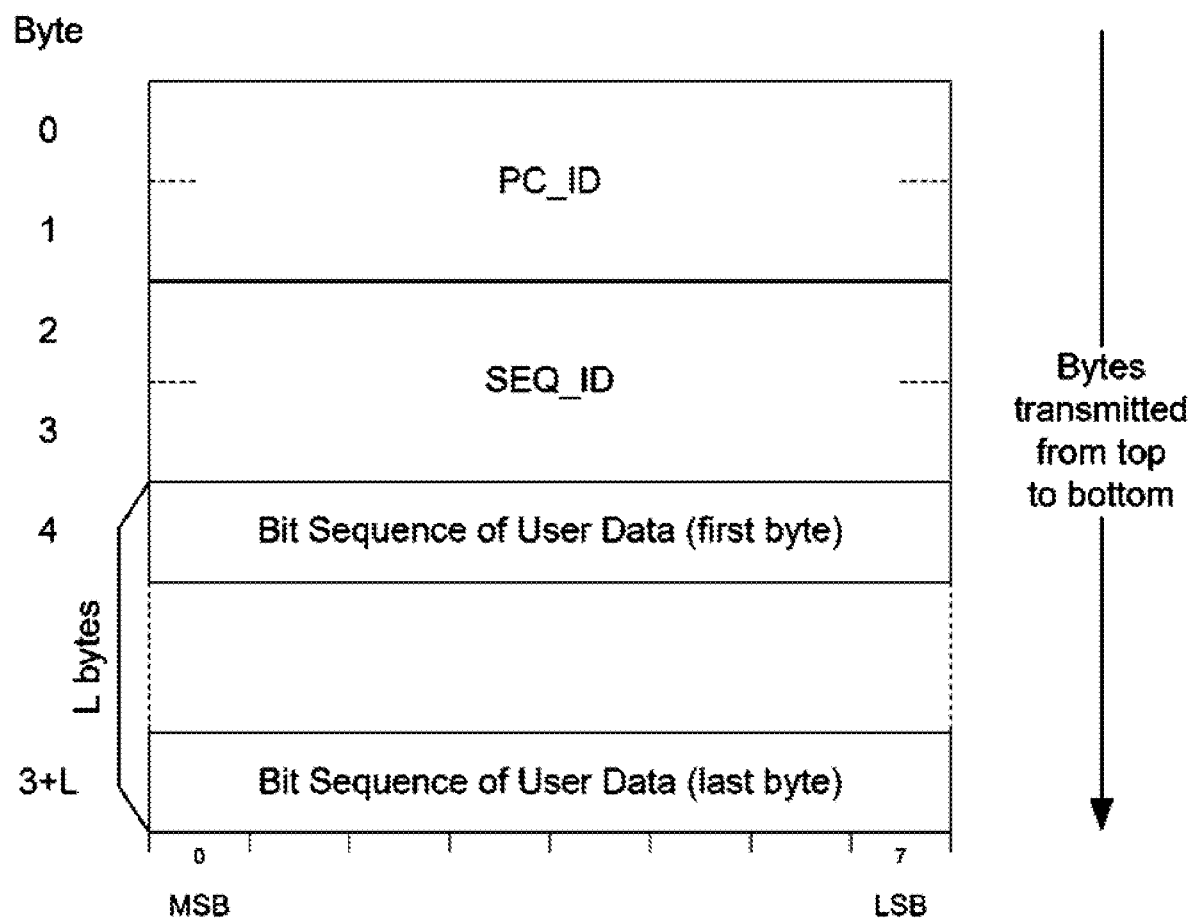

To further facilitate the following discussion on embodiments, the eCPRI message format, eCPRI common header format and format for message type 0 (in-phase-quadrature, IQ, data) defined for eCPRI are illustrated in FIGS. 3A, 3B and 3C, respectively. In said Figures (and also in the following Figures), abbreviations "MSB" and "LSB" stand for most significant bit and least significant bit, respectively.

Referring to FIG. 3A, eCPRI messages consist of a four-byte eCPRI common header (illustrated in FIG. 3B in more detail) followed by a variable length eCPRI payload.

Referring to FIG. 3B, the eCPRI common header comprises the following header fields:
  An eCPRI protocol revision (field size: 4 bits) which is a positive integer indicating the protocol version.
  A "reserved" field (field size: 3 bits) which comprises bits reserved for future use by the CPRI specification group.
  A C bit which is a concatenation indicator with the following properties:
    "C=0" indicates that the eCPRI message is the last one inside the eCPRI protocol data unit (PDU).
    "C=1" indicates that another eCPRI message follows this one within the eCPRI PDU. In this case, 1 to 3 padding byte(s) may be added to ensure that the following eCPRI message starts at a 4-Byte boundary. Padding byte(s) may be ignored when received.
  An eCPRI message type (field size: 1 byte) which indicates the type of service conveyed by the message (see further details below).
  An eCPRI payload size (field size: 2 bytes) is the size in bytes of the payload part corresponding to the eCPRI message. It does not include any padding bytes following the eCPRI message. The maximum supported payload size may be $2^{16}-1$ but the actual size may be further limited by the maximum payload size of the underlying transport network.

Following eCPRI message types and associated values of the eCPRI message type field may be defined.

| Message type | Name of message |
| --- | --- |
| 0 | IQ data |
| 1 | Bit sequence |
| 2 | Real time control data |
| 3 | Generic data transfer |
| 4 | Remote memory access |
| 5 | One way delay measurement |
| 6 | Remote reset |
| 7 | Event indication |
| 8 to 63 | Reserved |
| 64 to 255 | Vendor specific |

The message type 0 (i.e., IQ data) is of special interest for the embodiments to be discussed below and is, thus, illustrated in FIG. 3C and discussed in the following in more detail. Referring to FIG. 3C, the illustrated IQ data transfer format comprises the following fields:
  PC_ID:
    An identifier of a series of "IQ Data Transfer" messages.
    For example, identifier of a physical channel, a user, a layer, an antenna port, etc. which has a common property for physical layer (PHY) processing.
    How to allocate values to PC_ID is vendor specific.
    Size: 2 bytes.
  SEQ_ID:
    An identifier of each message in a series of "IQ Data Transfer" messages.
    For example, identifier of an OFDM symbol, a block of sub-carriers, etc.
    How to allocate values to SEQ_ID is vendor specific.
    Size: 2 bytes.
  IQ Samples of User Data:
    A sequence of IQ sample pairs (I, Q) in frequency domain or time domain and associated control information if necessary.
    Frequency domain IQ or time domain IQ depends on the selected functional split between eCPRI nodes and is vendor specific.
    The bit width of an IQ sample, the number of IQ sample pairs in a message, and the format of IQ samples (e.g. fixed point, floating point, block floating point), etc. are vendor specific. The actual format is known by the transmit/receive eCPRI nodes in advance.

Figure 4A:
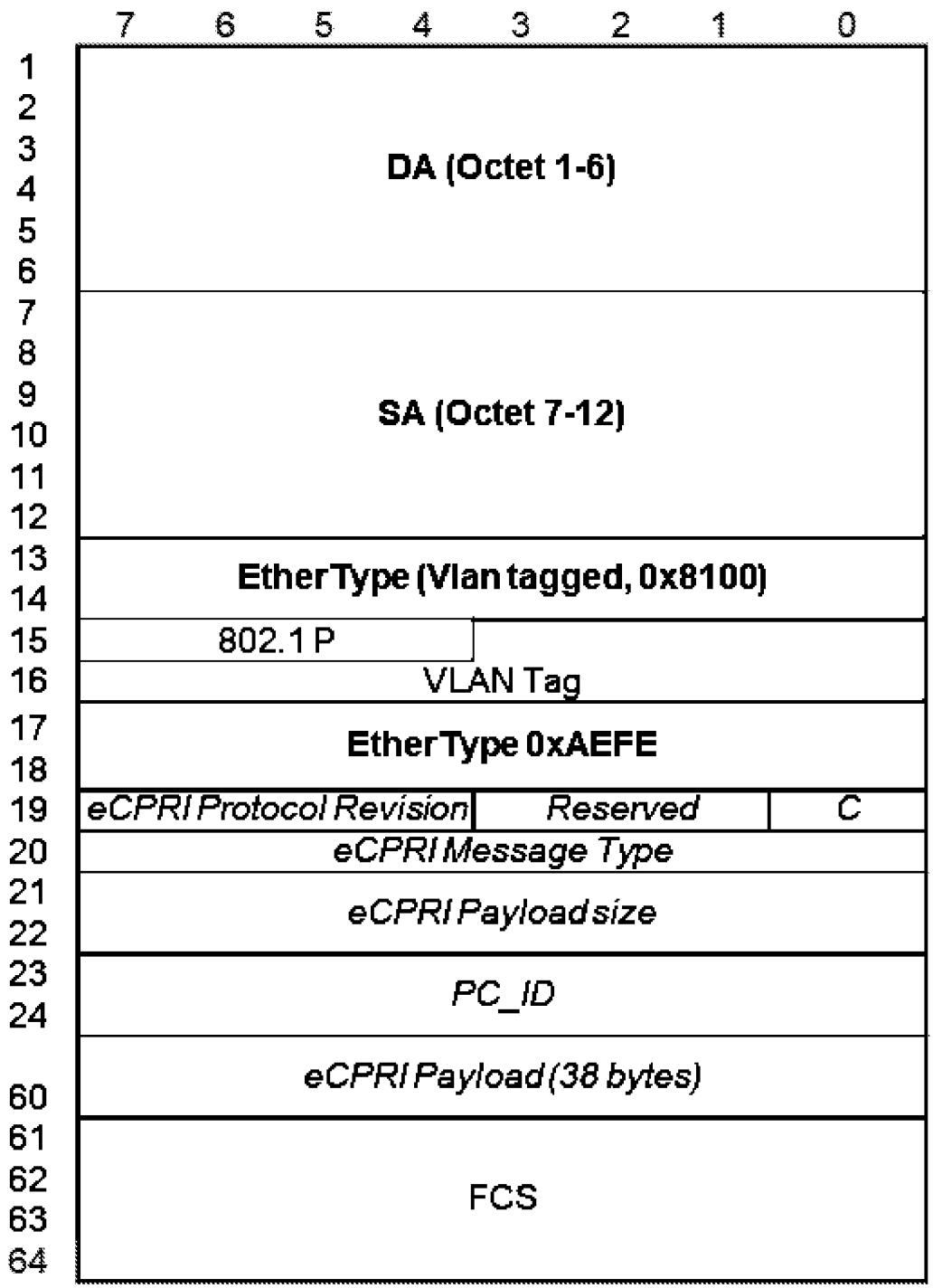
FIGS. 4A, 4B and 4C illustrate an eCPRI over Ethernet frame format, a IPv4 data packet format and a IPv6 data packet format, respectively.
Figure 4B:
Figure 4C:
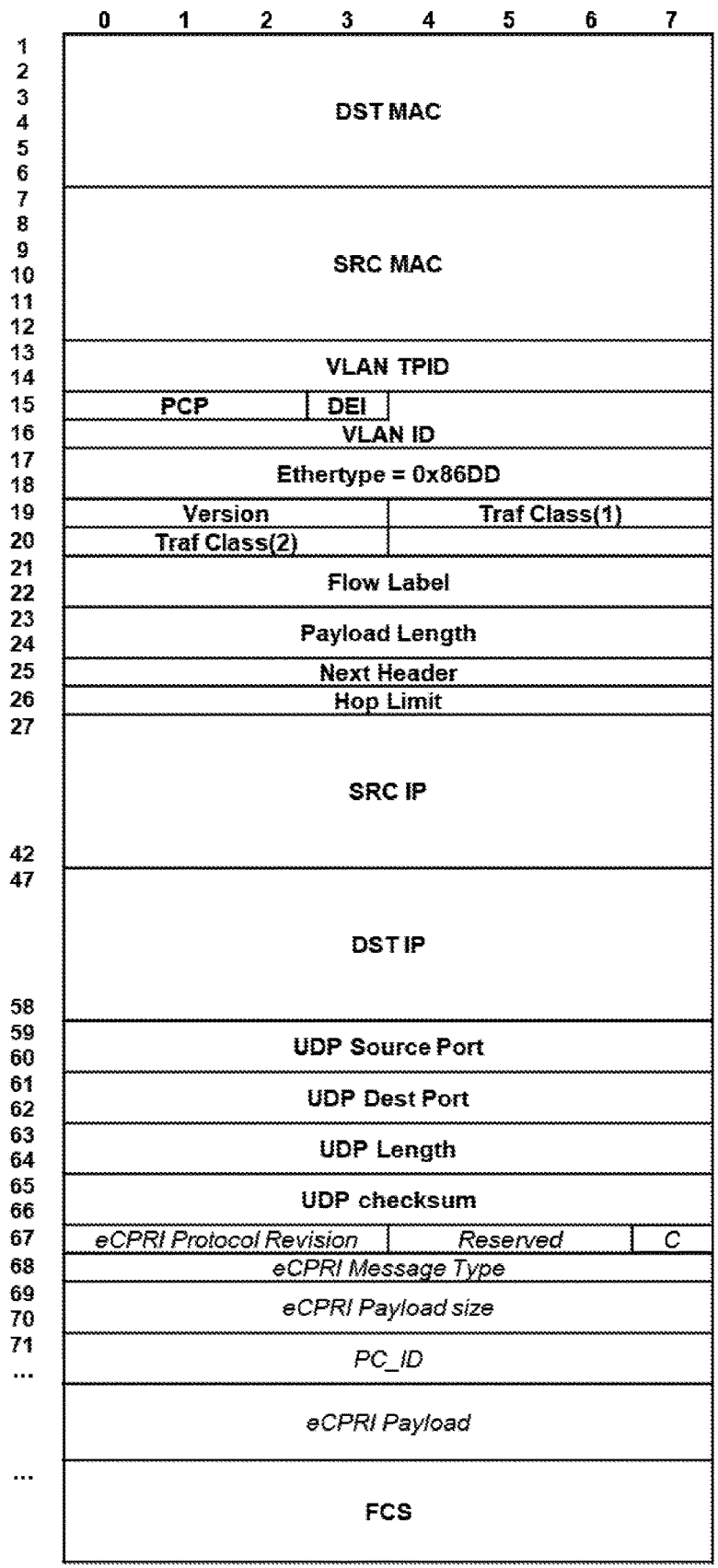

As described above, eCPRI may employ one of the following eCPRI encapsulations: eCPRI over Ethernet, eCPRI over IPv4 and eCPRI over IPv6. In eCPRI over Ethernet, eCPRI messages are transmitted in a standard Ethernet frame while, in eCPRI over IPv4 or IPv6, eCPRI messages are transmitted in user datagram protocol (UDP)/Internet protocol (IP) packets. These three options are illustrated in FIGS. 4A, 4B and 4C. Similar to the notational convention used in FIGS. 3A, 3B and 3C, in FIGS. 4A, 4B and 4C, the numbers running from top to bottom indicate the number of a transmitted byte (or octet) while the numbers running from left to right indicate the number of the bit in a given byte with the leftmost bit ("0" bit) corresponding to the most significant bit of said given byte.

Referring to FIG. 4A, the illustrated Ethernet frame is specifically an Ethernet frame using virtual local area network (VLAN) tagging (or specifically 802.1Q VLAN tagging) and encapsulating eCPRI. The Ethernet frame comprises at least a data link layer header (bytes 1 to 18), an eCPRI header (bytes 19 to 22), eCPRI payload and a frame checksum (FCS) (i.e., an error-detecting code that closes the frame). The data link layer header comprises destination address (DA) (bytes 1 to 6), a source address (SA) (bytes 7 to 12), an EtherType field for VLAN tagging (bytes 13 to 14) followed by a tag control information field (bytes 15 to 16) and an EtherType field defining eCPRI as type (bytes 17 to 18). The destination and source addresses are specifically medium access control (MAC) addresses. According to a general definition, the EtherType field(s) are used to indicate which protocol is encapsulated in the payload of the frame and is used at the receiving end by the data link layer to determine how the payload is processed. The EtherTypes 0x8100 and 0xAEFE correspond to 802.1Q (or 802.1ad) VLAN tagging and eCPRI, respectively. The EtherType field 0x8100 (bytes 13 to 14) may be equally called a VLAN tag protocol identifier (VLAN TPID). The tag control information field (bytes 15 to 16) may comprise specifically a priority code point (PCP), a drop eligible indicator (DEI) and a VLAN identifier (VID). The eCPRI header and payload may be defined as described in relation to FIGS. 3A to 3C.

In some embodiments, the EtherType field for VLAN tagging (bytes 13 to 14) and the following tag control information field (bytes 15 to 16) may be omitted.

Referring to FIG. 4B, the illustrated IPv4 packet is specifically an IPv4 packet encapsulating eCPRI. The IPv4 packet comprises at least a data link layer header (bytes 1 to 18), a network layer (i.e., layer-3) header (bytes 19 to 38), an UDP header (bytes 39 to 46), an eCPRI header (bytes 47 to 52), eCPRI payload and a frame checksum (FCS). Similar to FIG. 4A, the data link layer header comprises a (MAC) destination address (DA) (bytes 1 to 6), a (MAC) source address (DA) (bytes 7 to 12), an EtherType field (or VLAN TPID) for VLAN tagging (bytes 13 to 14) followed a tag control information field (bytes 15 to 16) and an EtherType field defining eCPRI as type (bytes 17 to 18). The eCPRI header comprises the eCPRI common header (bytes 47 to 50) and at least also the PC_ID field associated with message type 0 (bytes 51 to 52). The EtherType 0x0800 (bytes 17-18) corresponds to Internet protocol version 4 (IPv4). Similar to as described above, the tag control information field (bytes 15 to 16) may comprise specifically a priority code point (PCP), a drop eligible indicator (DEI) and a VLAN identifier (VID). The eCPRI header and payload may be defined as described in relation to FIGS. 3A to 3C.

In some embodiments, the EtherType field (or VLAN TPID) for VLAN tagging (bytes 13 to 14) and the following tag control information field (bytes 15 to 16) may be omitted.

The IPv4 header may comprise the following header fields (or one or more of the following header fields):

- a version number of IP protocol used (i.e., IPv4 here) (byte 19),
- an Internet header length (i.e., a length of the entire IP header) (byte 19),
- a differentiated services code point (SDCP) specifying differentiated services (byte 20),
- an explicit congestion notification (ECN) carrying information about the congestion seen in the route (byte 20),
- a total length indicating the length of the entire IP packet (including IP header and IP Payload) (bytes 21 to 22),
- an identification field used (primarily) for uniquely identifying the group of fragments of a single IP datagram (bytes 23 to 24)
- a flags field used for controlling or identifying fragments (byte 25),
- a fragment offset indicating the exact position of a fragment in the original IP Packet (bytes 26),
- a time to live (TTL) field for preventing datagrams from persisting (e.g., going in circles) on the Internet by limiting a datagram's lifetime (byte 27),
- a protocol field defining the protocol used in the data portion of the IP datagram (byte 28),
- a header checksum field for defining a checksum value of the entire IPv4 header for error-checking (bytes 29 to 30),
- a source IP address (bytes 31 to 34) and
- a destination IP address (bytes 35 to 38).

The UDP header comprises the following header fields (or one or more of the following header fields):

- a UDP source port field identifying the sender's port (bytes 39 to 40)
- a UDP destination port field identifying the receiver's port (bytes 41 to 42),
- a UDP length specifying the length in bytes of the UDP header and UDP data (bytes 43 to 44) and
- a UDP checksum for error-checking of the UDP header and data (bytes 45 to 46).

Referring to FIG. 4C, the illustrated IPv6 data packet is specifically an IPv6 data packet encapsulating eCPRI. The IPv6 packet comprises at least a data link layer header (bytes 1 to 18), a network layer header (bytes 19 to 58), an UDP header (bytes 59 to 66), an eCPRI header (bytes 67 to 72), eCPRI payload and a frame checksum (FCS). The network layer header may be specifically here an IPv6 header. The eCPRI header comprises the eCPRI common header (bytes 67 to 70) and at least also the PC_ID field associated with message type 0 (bytes 71 to 72). The EtherType 0x86DD (in bytes 17-18) corresponds to Internet protocol version 6 (IPv6). The eCPRI header and payload may be defined as described in relation to FIGS. 3A to 3C.

The definitions provided in connection with FIGS. 4A and 4B apply, mutatis mutandis, for FIG. 4C, unless otherwise stated. The obvious difference between the IPv4 packet of FIG. 4B and IPv6 of FIG. 4C is the inclusion of the IPv6 header (as opposed to an IPv4 header). The IPv6 header may comprise the following header fields (or one or more of the following header fields):

- a version number of IP protocol used (i.e., IPv4 here) (byte 19),
- first and second two traffic class fields defining differentiated services and explicit congestion notification (ECN) (bytes 19 and byte 20, respectively),
- a flow label being a high-entropy identifier of a flow of packets between a source and destination (bytes 21 to 22),
- a payload length indicating the size of the payload in octets (including any extension header) (bytes 23 to 24),
- a next header specifying the type of the next header (byte 25),
- a hop limit having a value which is decremented by one at each forwarding node and packet discarded if it becomes 0 (byte 26),
- a source IP address (bytes 27 to 42) and
- a destination IP address (bytes 47 to 58).

Figures 5, 6A, 6B:
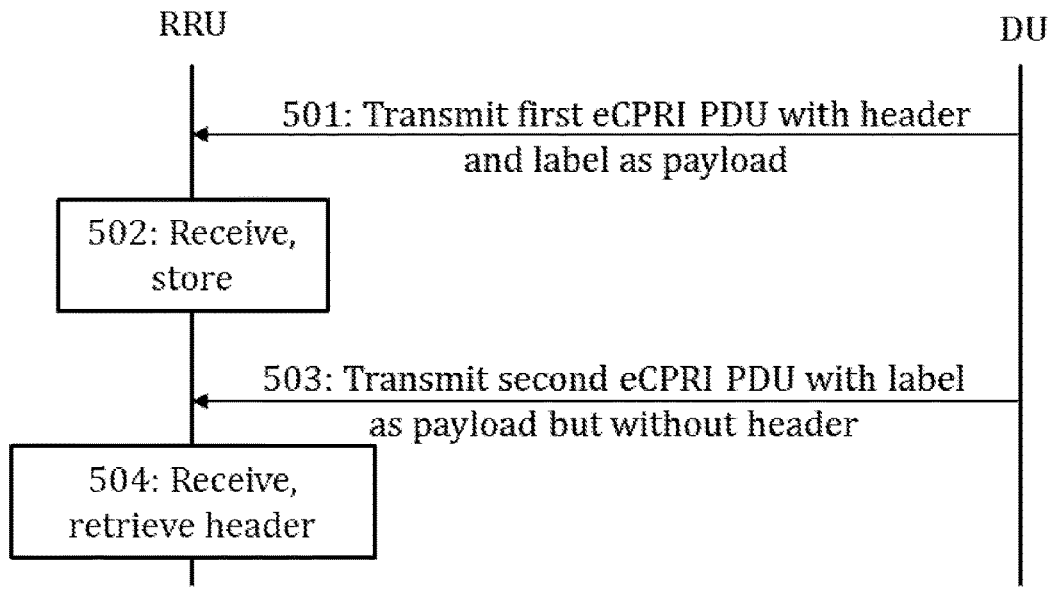
FIGS. 5, 7 and 8 illustrate examples of processes according to embodiments.
FIGS. 6A and 6B illustrate exemplary label formats according to embodiments.

FIG. 5 illustrates exemplary processes according to embodiments performed by a distributed unit of a distributed access node and remote radio unit of the distributed access node (or respective subunits therein) for implementing header compression of eCPRI messages. As described above, the distributed unit may correspond to the eCPRI Radio Equipment Control (eREC) and the remote radio unit may correspond to the eCPRI Radio Equipment (eRE). The distributed unit may be the distributed unit 104 of FIG. 1 and/or the distributed unit 220 of FIG. 2. The remote radio unit may be either of the remote radio units 201, 202 of FIG. 2.

Referring to FIG. 5, the distributed unit transmits, in message 501, a first protocol data unit (PDU) using eCPRI to a remote radio unit. The first PDU (i.e., a first frame or data packet) comprises a first header and, as payload, at least a first label for the first header. Said first label may be used for unique identification of the first header. Said first label comprises at least a compressed eCPRI header. In some embodiments, the first label may also comprise a compressed data link layer (i.e., layer-2) header. The compression of a header may correspond, here and in the following, to reducing the size of the header by reducing the size of one or more header fields (e.g., by indexing their values) and possibly also omitting one or more header fields (i.e., one or more header fields not required, in a given application, for unique identification of the header). The first PDU (i.e., the first eCPRI PDU) may be transmitted specifically using any of eCPRI over Ethernet, eCPRI over IPv4 and eCPRI over IPv6. If eCPRI over Ethernet is used, the first PDU is a first (Ethernet) frame while, if the eCPRI over IPv4 or IPv6 is used, the first PDU is a first (IPv4 or IPv6) data packet. Correspondingly, the first PDU may have the format illustrated in any of FIGS. 4A, 4B and 4C. The compressed data link layer header and/or the compressed eCPRI header may specifically correspond to compressed versions of the data link layer and the eCPRI header as defined in connection with FIGS. 4A, 4B and 4C.

Specifically, the compressed eCPRI header may comprise at least a concatenation indicator bit (i.e., a C bit) and one or more (preferably, all) of the following header fields in a compressed form: an eCPRI message type, an EtherType and a PC_ID defined for the IQ data message type. For example, each of the eCPRI message type and the EtherType fields may be compressed to three bits for defining eight different unique values. The PC_ID may also be compressed to three bits so that only a maximum of eight different physical equipment are supported. In compressing the eCPRI header, the "reserved" field of the eCPRI common header format may be discarded altogether. The eCPRI protocol revision field may also be left out of the compressed eCPRI header as it may be fixed per PC_ID and thus it may be learned by the remote radio unit. In other words, if the PC_ID is included in the first label (in a compressed form), there is no need to include the eCPRI protocol revision as the PC_ID value uniquely defines also the eCPRI protocol revision.

Additionally or alternatively, the compressed data link layer header may comprise at least one or more (preferably, all) of the following header fields in a compressed form: a VLAN TPID, an EtherType value and MAC source and destination addresses (MAC SA & DA). The MAC destination and source addresses are compressed as a pair, that is, a pair of MAC source and destination addresses use only one index. The VLAN TPID field and the MAC source and destination addresses (together) may be compressed to three bits and six bits, respectively. The EtherType value may also be compressed to three bits so that only the 8 generic standard message types (message types 0 to 7) are supported.

In an embodiment, the compressed eCPRI header and the compressed data link layer header comprises all the header fields mentioned above and the eCPRI corresponds specifically to eCPRI over Ethernet. An example of a label format which may be employed in this case is discussed below in connection with FIG. 6A.

In response to receiving the first PDU using eCPRI from the distributed unit in block 502, the remote radio unit stores, in block 502, the first header and the first label for the first header to a learning index maintained in a memory of the remote radio unit. Specifically, the remote radio unit may store not only the first header and the first label but also the mapping (or association) between the first header and the first label. In other words, the remote radio unit may add an entry into the learning index, where said entry comprises the first header and the first label. In some embodiments, the first header and/or the first label for the first header may be stored in block 502 only partly.

Following the transmitting of the first PDU in message 501 (and preferably the storing in block 502), the distributed unit transmits, in message 503, a second PDU without a header using eCPRI to the remote radio unit. The second PDU corresponds to the first header (i.e., the information provided in the first header is applicable also for the second PDU). Moreover, the second PDU comprises, as payload, a second label comprising at least said eCPRI header (and optionally the compressed data link layer) for enabling accessing of the first header locally by the remote radio unit (from the learning index of the remote radio unit). In other words, the second label matches the first label, at least in regards to the eCPRI header (optionally also in regards to the data link layer header and, according to some embodiments to be discussed below in more detail, a network layer header if such a header is included in the first and second PDUs). The second PDU (i.e., the second eCPRI PDU) may be transmitted using the same one of eCPRI over Ethernet, eCPRI over IPv4 and eCPRI over IPv6 as used for transmitting the first PDU (though omitting the header). Correspondingly, the second PDU (i.e., the second Ethernet frame or IPv4 or IPv6 data packet) may have the format illustrated in any of FIGS. 4A, 4B and 4C without the illustrated header.

In response to receiving, following the storing, the second PDU having no header from the distributed unit in block 504, the remote radio unit retrieves, in 504, the first header for the second PDU (or at least a part of the first header for the second PDU) from the learning index based on the second label. As described above, the second label may match the first label maintained in the learning index at least in regards to the compressed data link layer header and the compressed eCPRI header (optionally also in regards to a compressed network layer header if such a network layer header is included in the first PDU). In some embodiments, one or more (compression and/or learning) indication bits for which matching is not required for a successful retrieval may be included in the labels (as will be described below in more detail). In some embodiments, at least one compression indication bit may be required for indicating the presence of fields of following fields of the label.

In embodiments where the eCPRI corresponds to eCPRI over IPv4 or eCPRI over IPv6 (and thus the first and second PDUs are IPv4 or IPv6 data packets defined according to FIG. 4B or 4C), the first and second labels may further comprise an IP version indication bit (for indicating whether IPv4 or IPv6 is used), a compressed network layer header and a compressed UDP header. The IP version indication bit, the compressed network layer header and the compressed UDP header may have the same contents for the first and second label. In such embodiments, the compressed network layer header may comprise one or more (preferably, all) of the following header fields in a compressed form: an IP source address and an IP destination address. Similar to as discussed above for MAC source and destination addresses, the IP source and destination addresses are compressed as a pair, that is, a pair of IP source and destination addresses use only one index. The IP source and destination addresses (together) may be compressed to six bits. Additionally or alternatively, the compressed UPD header may comprise one or more (preferably, all) of the following header fields in a compressed form: a (UDP) source port and a (UDP) destination port. Each of the (UDP) source and destination ports may be compressed to three bits (i.e., to six bits altogether). An example of a label format which may be employed in this case is discussed below in connection with FIG. 6B.

Following the transmission of the second PDU in message 503, any subsequent PDUs corresponding to said first header (i.e., scheduled to be transmitted using the first header) may be handled in a similar manner as discussed in connection with elements 503, 504 for the second PDU.

FIGS. 6A and 6B illustrates two exemplary formats according to embodiments for a label defined for a header. Specifically, FIG. 6A illustrates an exemplary header format for use with eCPRI over Ethernet and FIG. 6B illustrates an exemplary header format for use with eCPRI over IPv4 and eCPRI over IPv6. In some embodiments, the first and second labels as mentioned in connection with FIG. 5 may have the format illustrated in FIG. 6A or 6B.

Referring to FIG. 6A, the label consists of three bytes and eleven distinct fields, each being 1-6 bits long. Namely, the illustrated label comprises:

"L2 comp" (byte 1, bit 0): A data link layer (i.e., layer-2) compression indication bit indicating whether or not the data link layer header is compressed.

"L3 comp=no" (byte 1, bit 1): A network link layer (i.e., layer-3, L3) compression indication bit indicating whether or not the network layer header is compressed. As no network layer header is involved when using eCPRI over Ethernet, this indication bit has a value indicating a negative result (e.g., 0).

"VLAN stack" (byte 1, bits 2-4): A compressed VLAN TPID which identifies the possible different VLAN stacking.

"protocol" (byte 1, bits 5-7): A compressed EtherType value.

"eCPRI comp" (byte 2, bit 0): A eCPRI compression indication bit indicating whether or not the eCPRI header is compressed.

"learn" (byte 2, bit 1): A learning indication bit indicating to a receiver (i.e., to a RRU) whether or not the "MAC label" field is to be learned upon reception.

"MAC label" (byte 2, bits 2-7): A field comprising compressed MAC source and destination addresses.

"eCPRI C bit" (byte 3, bit 0): A concatenation indicator bit.

"learn" (byte 3, bit 1): A learning indication bit indicating to a receiver (i.e., to a RRU) whether or not the "msg_type" and "PC_ID" fields are to be learned.

"msg_type" (byte 3, bits 2-4): A compressed eCPRI message type field enabling support for 8 message types (e.g., the standard message types 0-7).

"PC_ID" (byte 3, bits 5-7): A compressed PC_ID field defined for the IQ data message type of eCPRI (assuming that a maximum of 8 different physical equipment may be compressed).

Referring to FIG. 6B, the label consists of five bytes and eighteen distinct fields, each being 1-6 bits long. Namely, the illustrated label comprises:

L2 comp" (byte 1, bit 0): A data link layer (i.e., layer-2) compression indication bit indicating whether or not the data link layer header is compressed.

"L3 comp=yes" (byte 1, bit 1): A network link layer (i.e., layer-3) compression indication bit indicating whether or not the network layer header is compressed. As a network layer header is involved when using eCPRI over IPv4 or IPv6, this indication bit has a value indicating a positive result (e.g., 1).

"VLAN stack" (byte 1, bits 2-4): A compressed VLAN TPID which identifies the possible different VLAN stacking.

"protocol" (byte 1, bits 5-7): A compressed EtherType value.

"UDP comp" (byte 2, bit 0): A UDP compression indication bit indicating whether or not the UDP header is compressed.

"learn" (byte 2, bit 1): A learning indication bit indicating to a receiver (i.e., to a RRH) whether or not the "MAC label" field is to be learned upon reception.

"MAC label" (byte 2, bits 2-7): A field comprising compressed MAC source and destination addresses.

"IP version" (byte 3, bit 0): An IP version indication bit indicating whether IPv4 or IPv6 is used.

"learn" (byte 3, bit 1): A learning indication bit indicating to a receiver (i.e., to a RRH) whether or not the "IP label" field is to be learned upon reception.

"IP label" (byte 3, bits 2-7): A field comprising compressed IP source and destination addresses.

"eCPRI comp" (byte 4, bit 0): A eCPRI compression indication bit indicating whether or not the eCPRI header is compressed.

"UDP source port" (byte 4, bits 2-4): A compressed UDP source port field (8 different UDP source ports supported).

"UDP dest port" (byte 4, bits 5-7): A compressed UDP destination port field (8 different UDP destination ports supported).

"eCPRI C bit" (byte 5, bit 0): A concatenation indicator bit.

"learn" (byte 5, bit 1): A learning indication bit indicating to a receiver (i.e., to a RRH) whether or not the "msg_type" and "PC_ID" fields are to be learned.

"msg_type" (byte 5, bits 2-4): A compressed eCPRI message type field enabling support for 8 generic standard message types.

"PC_ID" (byte 5, bits 5-7): A compressed PC_ID field defined for the IQ data message type of eCPRI (assuming that a maximum of 8 different physical equipment may be compressed).

Referring to both FIGS. 6A and 6B, similar to as described in relation to above embodiments, the reserved and eCPRI protocol revision fields of the common eCPRI header may be omitted from the label. The eCPRI protocol revision field may be fixed per PC_ID and learned by the remote radio head while the reserved may be discarded altogether.

The "VLAN stack" field (i.e., a compressed VLAN TPID field) illustrated in FIGS. 6A and 6B consists of three bits and thus may have one of eight different values. These eight different values may specifically map to the following eight definitions:

0: none

1: customer VLAN (CVLAN) only (0x8100)

2: CVLAN followed by CVLAN
3: CVLAN followed by service VLAN (SVLAN)
4: none
5: SVLAN only (0x88a8)
6: SVLAN followed by SVLAN
7: SVLAN followed CVLAN.

The "protocol" field (i.e., compressed EtherType field) illustrated in FIGS. 6A and 6B consists of three bits and thus may have one of eight different values. These eight different values may specifically map to the following eight definitions:

0: none
1: user defined 0
2: user defined 1
3: eCPRI (0xAEFE)
4: IPv4 (0x0800)
5: IPv6 (0x86DD)
6: Multiprotocol Label Switching (MPLS) unicast (0x8847)
7: MPLS multicast (0x8848).

Figure 7:
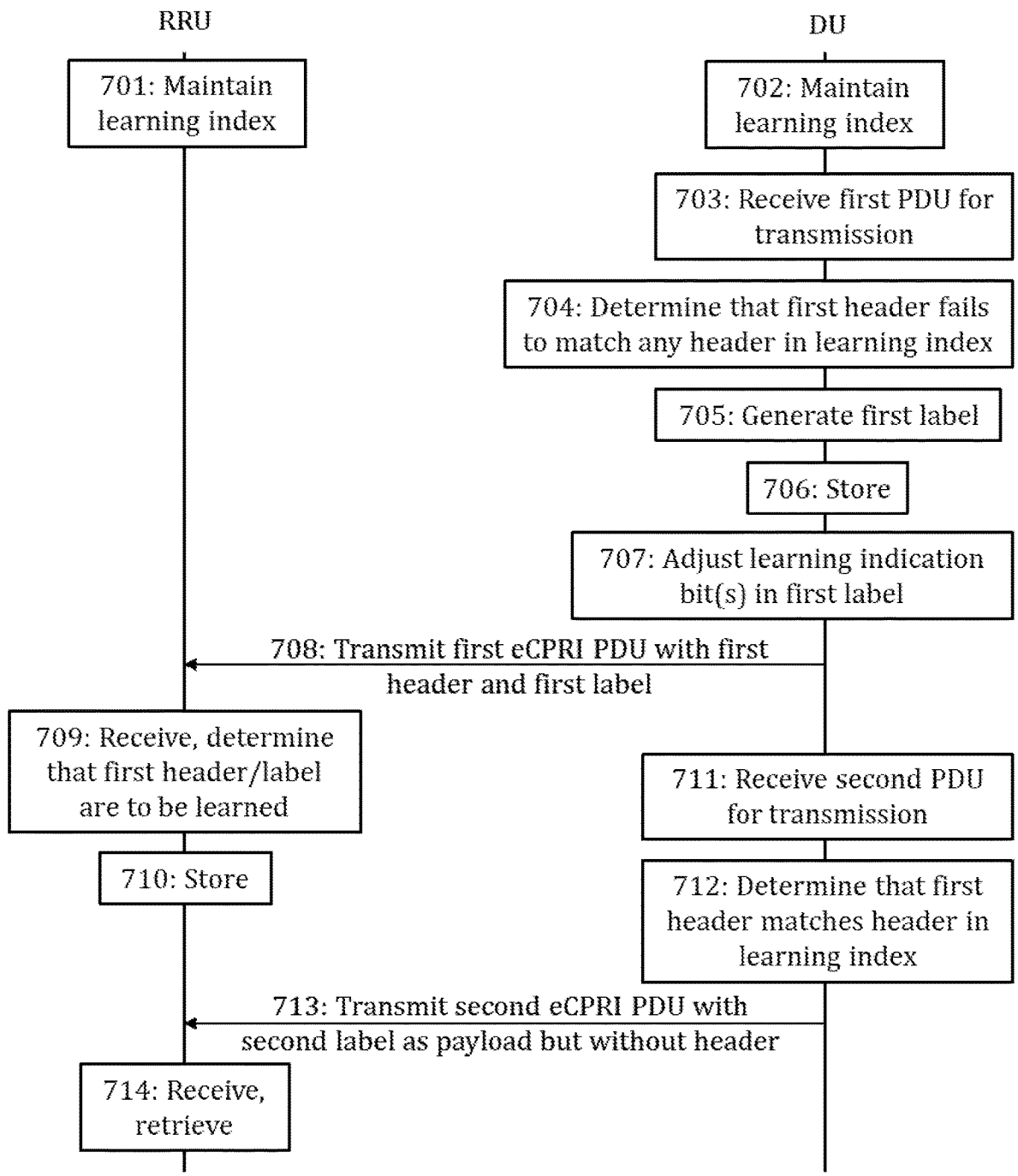

FIG. 7 illustrates further exemplary processes according to embodiments performed by a distributed unit of a distributed access node and remote radio unit of the distributed access node (or respective subunits therein) for implementing header compression of eCPRI messages. As described above, the distributed unit may correspond to the eCPRI Radio Equipment Control (eREC) and the remote radio unit may correspond to the eCPRI Radio Equipment (eRE). The distributed unit may be the distributed unit 104 of FIG. 1 and/or the distributed unit 220 of FIG. 2. The remote radio unit may be either of the remote radio units 201, 202 of FIG. 2.

FIG. 7 corresponds to a large extent to FIG. 5 with some further features added. Consequently, the discussion provided in connection with FIG. 5 applies, mutatis mutandis, also for FIG. 7, unless otherwise explicitly stated. The definitions provided in connection with any of FIGS. 6A and 6B may also apply, at least in some embodiments.

Referring to FIG. 7, it is initially assumed that both the remote radio unit and the distributed unit maintain, in respective memories, separate (but synchronized) learning indices, as illustrated in blocks 701, 702. Each learning index preferably comprises a plurality of labels mapped to a plurality of headers used in eCPRI transmissions (that is, transmission using eCPRI over Ethernet, IPv4 and/or IPv6). Each of the plurality of labels comprises at least a compressed eCPRI header (optionally also one or more of a compressed data link layer header, an IP version indication bit, a compressed network layer header and a compressed UDP header). At least some of the plurality of labels may have the format specified in FIGS. 6A and/or 6B. In general, the plurality of labels may be defined according to any definition provided above (or to be described below).

The distributed unit receives, in block 703, a first PDU (e.g., a first Ethernet frame or a first IPv4 or IPv6 data packet) comprising a first header for transmission using eCPRI to the remote radio unit. Specifically, the first PDU may be received from a central unit (CU) of the distributed access node. Before transmitting the first PDU using eCPRI to the remote radio unit, the distributed unit determines, in block 704, whether the first header matches any header maintained in the learning index (fully or partly). The determining in block 704 may take into account all the header fields or at least the header fields described in above embodiments as being included in the first label (in full or in a compressed format). In some embodiments, the determining in block 704 may also comprise, if a matching header is found, whether the matching header is associated in the learning index with a label (or specifically a fully complete label).

In this particular example, it is assumed that the determining in block 704 leads to a negative result (i.e., no match is found). In other words, the first header fails to match or only partly matches a header maintained in the learning index. Thus, in response to failing to find a match for the first header from the learning index of the distributed unit in block 704, distributed unit generates, in block 705, a first label based on the first header (i.e., performs compression on the first header to form a first label) and stores, in block 706, the first header and a first label (and information on the association/mapping between the first header and label) to the learning index of the distributed unit. The generation of the first label in block 705 may also be based on the learning index of the distributed unit as the format of the first label may be dependent on which header fields (if any) are already maintained in the learning index of the distributed unit (and are thus assumed to be maintained also in the learning index of the remote radio unit).

The distributed unit adjusts, in block 707, values of at least one learning indication bits of one or more learning indication bits included in the first label for indicating one or more header fields to be learned by the remote radio unit. In other words, the one or more learning indication bits may have, by default, a first value (e.g., 0) which is adjusted for said at least one learning indication bit to a second value (e.g., 1) in block 707. As described in relation to FIGS. 6A and 6B, the first label may comprise, for example, two or four learning indication bits in total.

Following the adjusting in block 707, the distributed unit transmits, in message 708, the first PDU (comprising the first header and, as payload, the first label with adjusted values for the one or more learning indication bits) using eCPRI to the remote radio unit. The message 707 may correspond to message 501 of FIG. 5.

In response to receiving the first PDU using eCPRI from the distributed unit in block 709, the remote radio unit determines, in block 708, based on the first label (or specifically on values of the one or more learning indication bits) whether the first header and label (or at least parts thereof) are to be learned. As described above, in this example, at least one learning indication bit has a value indicating that certain field or fields of the first label are to be learned. Consequently, the distributed unit stores, in block 709, the first header and the first label for the first header (or at least the one or more missing fields thereof) to the learning index of the remote radio unit.

Following the transmission of the first PDU, the distributed unit receives, in block 711, a second PDU comprising the first header from a central unit (CU) of the distributed access node for transmission using eCPRI to the remote radio unit. Again, the distributed unit determines, in block 712, whether the first header matches a header maintained in the learning index of the distributed unit (fully or partly). Block 712 may correspond to block 704. As the first header was stored to the learning index of the distributed unit in block 706, the determining in block 712 provides a positive result (i.e., a match is found). In other words, the distributed unit knows that the first header is a header which has been used before for a transmission to the remote radio unit and thus the remote radio unit should maintain a local copy of the first header in its learning index. Consequently, the distributed unit transmits, in message 713, a second PDU without a header but comprising a second label as payload using eCPRI to the remote radio unit. The second label may correspond to the first label transmitted in message 708, apart from values of learning indication bit(s) included in the first and second labels. The message 713 may correspond to message 503 of FIG. 5.

Similar to block 504 of FIG. 5, the remote radio unit retrieves, in block 714, in response to receiving of the second PDU without a header in block 714, the first header for the second PDU from the learning index of the remote radio unit based on the second label.

Figure 8:
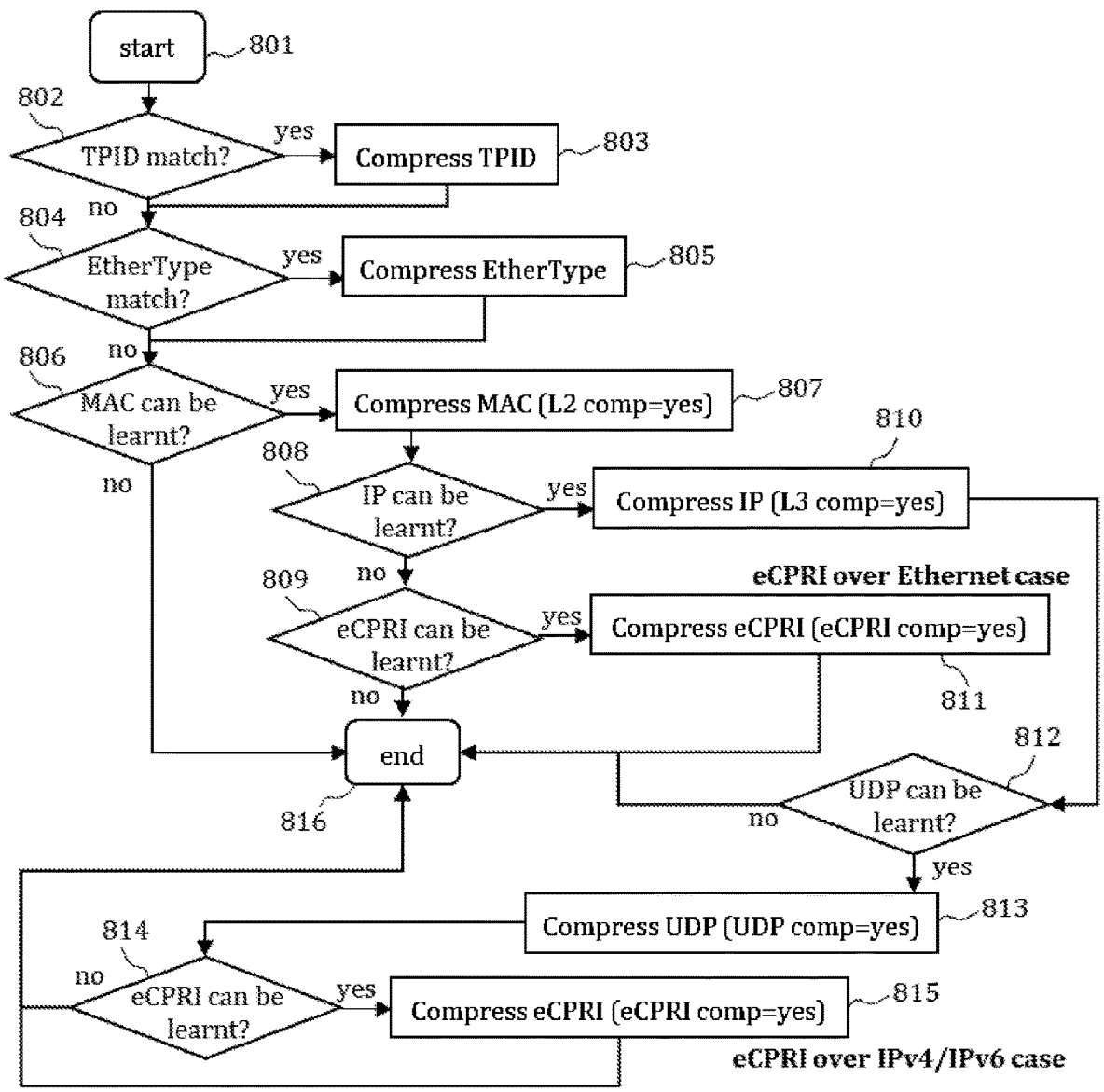

In some embodiments, the size and format of the label may be dynamically adjusted based on, for example, which header fields are comprised in the associated header (e.g., whether the header has the eCPRI over Ethernet format or the eCPRI over IPv4/IPv6 format), which header fields are currently not maintained in the learning index and consequently need to be transmitted to the remote radio unit for learning and which header fields to be transmitted have allowed values enabling compression. FIG. 8 illustrate an exemplary process of dynamic label generation (or PDU parsing) performed by a distributed unit for a first header. The illustrated process may correspond to a more detailed implementation of block 705 (or blocks 704, 705) of FIG. 7. The illustrated process may be used for generating labels as illustrated in FIGS. 6A and 6B. In general, the illustrated process may be carried out for each (new) header of each PDU to be transmitted to the remote radio unit.

Referring to FIG. 8, it is assumed that a first PDU comprising a first header has been received by a distributed unit. The first PDU may be an Ethernet frame or IPv4 or IPv6 data packet. The header compression process starts (block 801) by the distributed unit determining, in block 802, whether VLAN TPID field of the first header matches one of the VLAN TPID values for which compression is enabled (e.g., one of the eight "VLAN stack" field values listed above before the discussion on FIG. 7). In response to there being a match, the distributed unit compresses, in block 803, the VLAN TPID field. In other words, the distributed unit generates a compressed VLAN TPID field to be included in a first label. If no match is found in block 802 or following the compression in block 803, the process proceeds to the next check (block 804).

The distributed unit determines, in block 804, whether EtherType value field of the first header matches one of the EtherType values for which compression is enabled (e.g., one of the eight "protocol" field values listed above before the discussion on FIG. 7). In response to there being a match, the distributed unit compresses, in block 805, the EtherType field. In other words, the distributed unit generates a compressed EtherType value field to be included in the first label. Based on compression in blocks 803, 805, the distributed unit may create byte 1 of the label of FIG. 6A or 6B. If no match is found in block 804 or following the compression in block 805, the process proceeds to the next check (block 806).

The distributed unit determines, in block 806, whether the MAC source and destination addresses can be learned. As described above, only a limited number of different MAC addresses are supported by a given label format (e.g., 64 in the case of FIGS. 6A and 6B) and thus it may be possible that the first header defines MAC addresses which are not supported (i.e., which cannot be stored to the learning indices). In some embodiments, the distributed unit may be configured to replace the oldest MAC entry in the learning index if the learning index is full. In such embodiments, the MAC addresses may always be learned (i.e., the determination in block 806 may always provide a positive result), possibly apart from specific abnormal cases.

If the MAC addresses cannot be learned, the process terminates (block 816). In such a case, the first label may comprise only the first byte of the label format illustrated in FIGS. 6A and 6B (with both "L2 comp" and "L3 comp" having values indicating a negative result). Also, transmitting following PDUs having the same header from the distributed unit to the remote radio head is not possible in such a case. If the MAC addresses can be learned, the distributed unit compresses, in block 807, the MAC addresses in the first header. The compression in block 807, involves, in addition to creating a compressed MAC address field (by, e.g., creating byte 2 or at least the "MAC label" field therein of FIGS. 6A and 6B) for the first label, setting the "L2 comp" field in the first label to a value indicating a positive result.

Following the compression in block 807, the distributed unit determines, in block 808, whether the IP source and destination addresses can be learned.

If the IP addresses cannot be learned, the distributed unit determines, in block 809, whether the eCPRI header can be learned. The eCPRI header cannot be learned, for example, if the learning index is already full. If the eCPRI header cannot be learned, the process terminates (block 816). In such a case, the first label may comprise only the first two bytes of the label format illustrated in FIG. 6A (with only "L2 comp" having a value indicating a positive result). If the eCPRI header can be learned, the distributed unit compresses, in block 811, the eCPRI header (i.e., creates a compressed eCPRI header which may correspond, e.g., to byte 3 of FIG. 6A). Thereafter, the process terminates (block 816). Thus, the generation of an eCPRI over Ethernet label corresponding to the format of FIG. 6A involves carrying the actions relating to blocks 801 to 807, 808, 809, 811.

If the IP addresses can be learned, the distributed unit compresses, in block 810, the IP source and destination addresses included in the first header (i.e., creates a compressed IP address field to be included in the first label). The compression in block 807 involves, in addition creating a compressed IP address field (by, e.g., creating byte 3 or at least the "IP label" field therein of FIG. 6B) for the first label, setting the "L3 comp" field in the first label to a value indicating a positive result.

Following the compression in block 810, the distributed unit determines, in block 812, whether the UDP header (i.e., at least UDP source and destination ports) can be learned.

If the UDP header cannot be learned, the process terminates (block 816). In such a case, the first label may comprise only the first three bytes of the label format illustrated in FIG. 6B (with both "L2 comp" and "L3 comp" having a value indicating a positive result).

If the UDP header can be learned, the distributed unit compresses, in block 813, the UDP header comprised in the first header. The compression in block 813 involves, in addition creating a compressed UDP header (by, e.g., creating byte 4 or at least the "UDP source port" and "UDP dest port" fields therein of FIG. 6B) for the first label, setting the "UDP comp" field in the first label to a value indicating a positive result.

Following the compression in block 813, the distributed unit determines, in block 814, whether the eCPRI header can be learned. If the eCPRI header cannot be learned, the process terminates (block 816). In such a case, the first label may comprise only the first four bytes of the label format illustrated in FIG. 6B (with "L2 comp", "L3 comp" and "UDP comp" having values indicating a positive result). If the eCPRI header can be learned, the distributed unit compresses, in block 815, the eCPRI header (i.e., creates a compressed eCPRI header which may correspond, e.g., to byte 5 of FIG. 6B). Thereafter, the process terminates (block 816). Thus, the generation of an eCPRI over IPv4 or IPv6 label corresponding to the format of FIG. 6B involves carrying the actions relating to blocks 801 to 807, 808, 810, 812, 813, 815, 814. Blocks 814, 815 may correspond to blocks 809, 811.

In summary, the label length may be defined as follows:
The label is 1 byte long when no compression is performed (VLAN TPID/EtherType case)
1 additional byte is introduced when in addition to the above TPID/EtherType case, the data link layer header (or specifically the MAC addresses) are compressed (MAC addresses case)
1 additional byte is introduced when in addition to the above TPID/EtherType or MAC addresses cases, the network layer header (or specifically IP addresses) are compressed (IP addresses case)
1 additional byte is introduced when in addition to the above MAC addresses case, the eCPRI header is compressed (eCPRI over Ethernet case)
1 additional byte is introduced when in addition to the above IP addresses case, the UDP header is compressed (UDP case)
1 additional byte is introduced when in addition to the above UDP case, the ePCRI header is compressed (eCPRI over IPv4 or IPv6 case).

According to some (more general) embodiments, block 705 (or blocks 704, 705) of FIG. 7 may comprise the following two steps. First, the distributed unit determines, for each of at least one header field of the first header, whether or not a given header field is maintained in the learning index and whether said header field has an allowed value enabling compression. Second (or possibly in parallel with the first step), the distributed unit forms the first label based on the determining. When forming the first label, the size and/or composition of the first label is adjusted based on which header fields are comprised in the first header, which header fields are not maintained in the learning index and consequently need to be transmitted to the second apparatus for learning and which header fields to be transmitted have allowed values enabling compression, the means being further configured to perform. These two steps may be carried out, for example, as described in connection with FIG. 8.

As mentioned above, in some embodiments, it may not be possible to fully compress a given header. Thus, subsequent transmission using the same header cannot rely solely on transmitting a corresponding label but also have to include a (reduced) header comprising the information which couldn't be compressed. In view of the embodiment of FIG. 7, this may mean that in response to at least one header field of the second PDU failing to have an allowed value enabling compression (or alternatively, in response to detecting that the associated label maintained in the learning index is incomplete), the distributed unit transmits the second PDU with a reduced header (as opposed to transmitting it without any header as illustrated with message 713) using eCPRI to the second apparatus. Here, the reduced header comprises at least said at least one header field not supporting compression.

The label formats described in connection with FIGS. 6A, 6B and 8 having potentially different sizes and compositions may be interpreted, in reception, as follows:

When "L3 comp" field (byte 1, bit 1) has a value indicating a negative result (e.g., 0) as in FIG. 6A, the receiver of the PDU containing the label (e.g., RRH) immediately knows that eCPRI over IPv4/IPv6 is not used and thus, assuming that "L2 comp" field also has a value indicating a positive results (e.g., 1), the receiver knows that the second byte has the format shown in FIG. 6A, as opposed to the format shown in FIG. 6B. Similarly, based on the value of the "eCPRI comp" field, the receiver knows whether or not to expect the label to contain a third byte comprising a compressed eCPRI header.

When "L3 comp" field (byte 1, bit 1) has a value indicating a positive result (e.g., 1) as in FIG. 6B, the receiver of the PDU containing the label (e.g., RRH) immediately knows that eCPRI over IPv4/IPv6 is used and thus, assuming that "L2 comp" field also has a value indicating a positive results (e.g., 1), the receiver knows that the second byte has the format shown in FIG. 6B, as opposed to the format shown in FIG. 6A. Based on the "UDP comp" field, the receiver knows whether or not to expect the label to contain a fourth byte comprising a "eCPRI comp" field and a compressed UDP header. The third byte comprising the IP header is included in the label automatically based on the positive value of "L3 comp" field. Again, based on the value of the "eCPRI comp" field, the receiver knows whether or not to expect the label to contain a fifth byte comprising a compressed eCPRI header.

In some instances when a new entry (i.e., a new combination of a header and a label) is to be stored to a learning index (as in, e.g., block 706 or 710 of FIG. 7), the learning index may already be full and thus said new entry cannot be simply added to the learning index. Two alternative solutions according to embodiments may exist for dealing with the situation where it is determined, before the storing of the entry, that the learning index is currently full.

According to the first alternative, the learning index is flushed or cleared periodically for robustness to guarantee that less frequently used entries (i.e., less frequently used headers/labels) do not consume the limited number of entries available in the learning index. For example, aging time of 100 ms may be employed here. The aging time specifies the time before an entry ages and is discarded from the learning index. With periodical flushing/clearing (and sufficiently large learning index), the learning index may (practically) never be filled and thus the aforementioned problem is avoided. In some embodiments, the clearing/flushing may be carried out only for certain pre-defined fields in the entries of the learning index. In general, flushing/clearing may be applied to one or more fields of the headers in the learning index as well as to one or more corresponding compressed fields of one or more labels in the learning index corresponding to said one or more headers. Conversely, certain pre-defined fields may never be flushed/cleared (e.g., EtherType field).

According to the second alternative, the new entry to be added to the learning index which is already full simply replaces one of the existing entries of the learning index (fully or at least in part). Specifically, the entry to be replaced may be the oldest entry in the learning index. The replacement may be performed at least if the new entry comprises certain mandatory fields (e.g., MAC source and destination addresses) not currently included in the learning index.

In some embodiments, the first and second alternatives may be implemented simultaneously. In such embodiments, flushing/clearing may be employed for certain pre-defined types of fields while the replacing is carried out for other pre-defined types of fields.

In some embodiments, in the case of a radio alarm degradation condition (for example, a degradation of the propagation channel, e.g., due to adverse weather conditions), the compression may be disabled.

In some embodiments, the packet parser may be able to perform a deep parse of the PDU to cope with multiple stack of VLAN or MPLS headers. The packet parser may identify said multiple stack of VLAN or MPLS headers based on the EtherType (i.e., VLAN TPID) or MPLS.

The embodiments discussed above provide benefits in terms of improved gain. The table below provides information on relative gain achieved when employing header compression without eCPRI header compression and with eCPRI header compression for different bit rates.

|  | Header compression gain (no eCPRI header compression) | Header compression gain (with eCPRI header compression) |
| --- | --- | --- |
| eCPRI over Ethernet 256B | 106% | 107% |
| eCPRI over Ethernet 512B | 103% | 103% |
| eCPRI over Ethernet 1500B | 101% | 101% |
| eCPRI over IPv4 256B | 109% | 110% |
| eCPRI over IPv4 512B | 104% | 105% |
| eCPRI over IPv4 1500B | 101% | 102% |
| eCPRI over IPv6 256B | 121% | 122% |
| eCPRI over IPv6 512B | 110% | 110% |
| eCPRI over IPv6 1500B | 103% | 103% |

While the processes according to embodiments have been discussed above as being carried out by a distributed unit of a distributed access node and a remote radio unit of the distributed access node, it should be noted that the aforementioned processes may, in other embodiments, be carried out using apparatuses other than the distributed unit and the remote radio unit. In some embodiments, the processes discussed above in connection with the distributed unit and the remote radio unit may be specifically carried out by an apparatus (e.g., a subunit) comprised in or electrically connected to the distributed unit and the remote radio unit, respectively.

The processes according to embodiments as discussed above may operate in a bidirectional manner. In other words, the functionalities described above in connection with a distributed unit of a distributed access node transmitting PDUs to a remote radio unit of the distributed access node may, in some embodiments, be carried out by a remote radio unit of a distributed access node transmitting PDUs to a distributed unit of the distributed access node. Conversely, the functionalities described above in connection with a remote radio unit of a distributed access node receiving PDUs from a distributed unit of the distributed access node may, in some embodiments, be carried out by a distributed unit of a distributed access node receiving PDUs from a remote radio unit of the distributed access node. In other words, the labels "RRU" and "DU" in FIGS. 5 and/or 7 may be replaced, in some embodiments, by labels "DU" and "RRU", respectively.

The blocks, related functions, and information exchanges described above by means of FIGS. 5, 7 and 8 are in no absolute chronological order, and some of them may be performed simultaneously or in an order differing from the given one.

Figure 9:
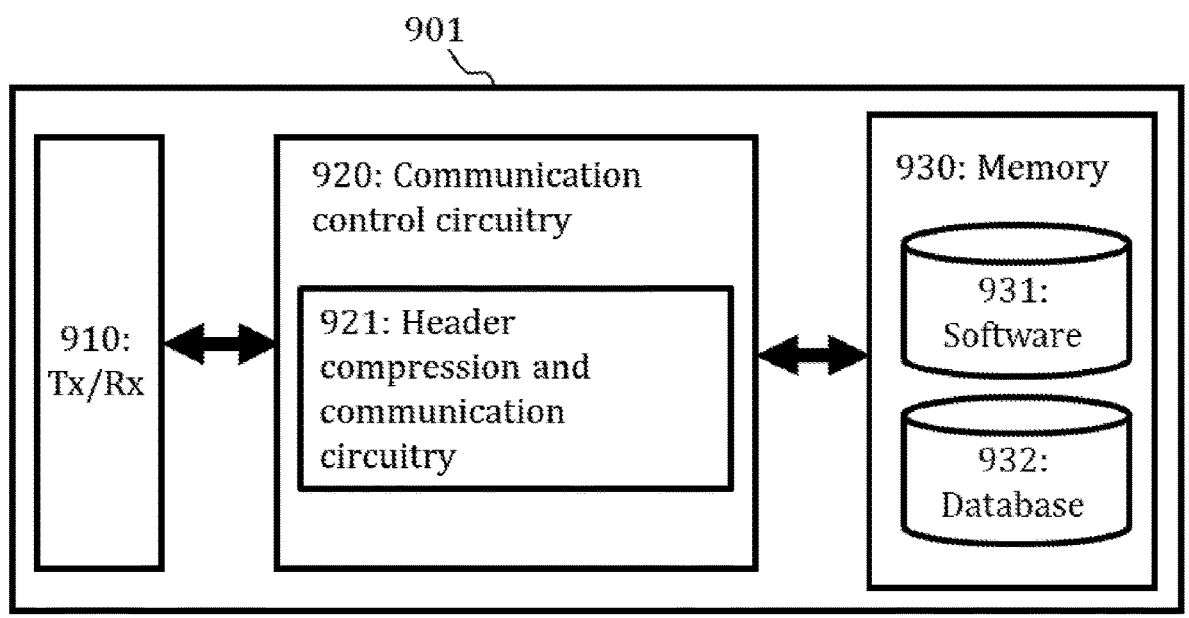
FIG. 9 illustrates an exemplary apparatus according to embodiments.

FIG. 9 illustrates an exemplary apparatus 901 configured to carry out the functions described above in connection with a distributed unit of a distributed access node and/or with a remote radio unit of the distributed access node. The apparatus 901 may be an electronic device comprising electronic circuitries. The apparatus 901 may comprise a communication control circuitry 920 such as at least one processor, and at least one memory 930 including a computer program code (software) 931 wherein the at least one memory 930 and the computer program code (software) 931 are configured, with the at least one processor, to cause the apparatus to carry out any one of the embodiments of the distributed unit and/or the remote radio unit described above. Said at least one memory 930 may also comprise at least one database 932. The apparatus 901 may correspond to the distributed unit 104 of FIG. 1 and/or the distributed unit 220 of FIG. 2 and/or any of the remote radio units 201, 202 of FIG. 2. In some embodiments, said at least processor may be or comprise a field-programmable gate array (FPGA) for rapid concurrent processing.

The memory 930 may be implemented using any suitable data storage technology, such as semiconductor based memory devices, flash memory, magnetic memory devices and systems, optical memory devices and systems, fixed memory and removable memory. The memory may comprise a learning index, as described in previous embodiments.

The apparatus 901 may further comprise one or more communication interfaces (Tx/Rx) 910 comprising hardware and/or software for realizing communication connectivity according to one or more communication protocols (e.g., eCPRI or specifically any of eCPRI over Ethernet, over IPv4 and IPv6). The one or more communication interfaces 910 may provide the apparatus 901 with communication capabilities to communicate in the cellular communication system and enable communication with network nodes and terminal devices, for example. Specifically, when the apparatus 901 corresponds to a distributed unit, the one or more communication interfaces 910 may provide the apparatus 901 communication capabilities to communicate with one or more remote radio units (and a central unit). Conversely, when the apparatus 901 corresponds to a remote radio unit, the one or more communication interfaces 910 may provide the apparatus 901 communication capabilities to communicate with one or more distributed units. The one or more communication interfaces 910 may comprise standard well-known components such as an amplifier, filter, frequency-converter, (de)modulator, and encoder/decoder circuitries and one or more antennas.

Referring to FIG. 9, the communication control circuitry 920 may comprise at least header compression and communication circuitry 921 configured to provide header compression (i.e., label generation) and communication functionalities supporting the header compression. The header compression and communication circuitry 921 may be configured to carry out at least some of the processes illustrated in any of FIGS. 5, 7 and 8. In some embodiments, the header compression and communication circuitry 921 may be configured to carry out only the functionalities described in relation to the distributed unit or only the functionalities described in relation to the remote radio unit.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 1, 2, 3A, 3B, 3C, 4A, 4B, 4C, 5, 6A, 6B, 7 and 8 may be carried out by an apparatus comprising corresponding means for carrying out at least some of the described processes. Some example means for carrying out the processes may include at least one of the following: detector, processor (including dual-core and multiple-core processors), microprocessor, digital signal processor (DSP), controller, micro-controller, receiver, transmitter, encoder, decoder, memory, RAM, ROM, software, firmware, display, user interface, display circuitry, user interface circuitry, user interface software, display software, circuit, antenna, antenna circuitry, application-specific integrated circuit (ASIC), digital signal processing device (DSPD), programmable logic device (PLD) and field programmable gate array (FPGA). For firmware or software, the implementations according embodiments may be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. In an embodiment, the at least one processor, the memory, and the computer program code form processing means or comprises one or more computer program code portions for carrying out one or more operations according to any one of the embodiments of FIGS. 1, 2, 3A, 3B, 3C, 4A, 4B, 4C, 5, 6A, 6B, 7 and 8 or operations thereof.

Embodiments as described may also be carried out in the form of a computer process defined by a computer program or portions thereof. Embodiments of the methods described in connection with FIGS. 1, 2, 3A, 3B, 3C, 4A, 4B, 4C, 5, 6A, 6B, 7 and 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first apparatus comprising:
at least one processor; and
at least one memory including computer program code, the at least one memory and the computer program code being configured, with the at least one processor, to cause the first apparatus to perform:
transmitting a first protocol data unit (PDU) using enhanced common public radio interface (eCPRI) to a second apparatus, wherein the first PDU comprises a first header and, as payload, at least a first label for the first header, said first label comprising at least a compressed eCPRI header; and
transmitting, following the transmitting of the first PDU, a second PDU without a header using eCPRI to the second apparatus, wherein the second PDU corresponds to the first header and comprises a second label comprising at least said compressed eCPRI header for enabling accessing of the first header locally by the second apparatus, wherein
the eCPRI corresponds to eCPRI over Ethernet and the first and second PDUs are first and second Ethernet frames,
the eCPRI corresponds to eCPRI over internet protocol version 4 (IPv4) or eCPRI over internet protocol version 6 (IPv6), the first and second PDUs are first and second internet protocol (IP) data packets, the first and second labels further comprising an IP version indication bit, a compressed network layer header and a compressed user datagram protocol (UDP) header, and
the compressed UDP header comprises one or more of the following header fields in a compressed form: a source port and a destination port and the compressed network layer header comprises one or more of the following header fields in a compressed form: an IP source address and an IP destination address.

2. The first apparatus of claim 1, wherein the compressed eCPRI header comprises at least a concatenation indicator bit and one or more of the following header fields in a compressed form: an eCPRI message type, an eCPRI protocol revision and a PC_ID defined for an in-phase-quadrature (IQ) data message type.

3. The first apparatus according to claim 1, wherein the first label and the second label further comprise a compressed data link layer header comprising at least one or more of the following header fields in a compressed form: a virtual local area network tag protocol identifier (VLAN TPID), an EtherType value and medium access control (MAC) source and destination addresses.

4. The first apparatus according to claim 1, wherein the first and second labels comprise one or more learning indication bits indicating whether one or more header fields in full and in a compressed form are to be learned by the second apparatus based on a corresponding received PDU, the one or more learning indication bits of the first label indicating that said one or more header fields of the first header are to be learned, at least in part, by the second apparatus and the one or more learning indication bits of the second label indicating that no header fields are to be learned by the second apparatus.

5. The first apparatus according to claim 1, wherein the first and second labels comprise one or more compression indication bits indicating whether one or more header fields have been compressed.

6. The first apparatus according to claim 1, wherein the at least one memory and the computer program code are further configured, with the at least one processor, to cause the first apparatus to perform:
   maintaining, in said at least one memory, a learning index comprising a plurality of labels mapped to a plurality of headers used in transmissions according to the eCPRI, wherein each of the plurality of labels comprises at least a compressed eCPRI header;
   receiving, before the transmitting of the first PDU, the first PDU comprising the first header for transmission to the second apparatus;
   determining, in response to the receiving of the first PDU and before the transmitting of the first PDU, whether the first header matches a header maintained in the learning index;
   in response to the first header failing to match any header in the learning index,
      generating the first label based on the first header,
      storing the first header and the first label to the learning index and
      performing the transmitting of the first PDU;
   receiving, before the transmitting of the second PDU, the second PDU comprising the first header for transmission to the second apparatus;
   determining, in response to the receiving of the second PDU and before the transmitting of the second PDU, whether the first header matches a header maintained in the learning index; and
   performing the transmitting of the second PDU without any header in response to determining that the first header to be transmitted is already maintained in the learning index.

7. The first apparatus according to claim 6, wherein the generating of the first label based on the first header comprises:
   determining, for at least one header field of the first header, whether or not a header field is maintained in the learning index or whether the header field has an allowed value enabling compression; and
   forming the first label based on the determining, wherein a size or composition of the first label is adjusted based on which header fields are comprised in the first header, which header fields are not maintained in the learning index and consequently need to be transmitted to the second apparatus for learning or which header fields to be transmitted have allowed values enabling compression, wherein the at least one memory and the computer program code are configured, with the at least one processor, to cause the first apparatus to perform, after the receiving of the second PDU:
      in response to at least one header field of the second PDU failing to have an allowed value enabling compression, transmitting the second PDU with a reduced header using eCPRI to the second apparatus, wherein the reduced header comprises at least said at least one header field not supporting compression.

8. The first apparatus according to claim 1, wherein the first apparatus comprises one of a distributed unit of a distributed access node and a remote radio unit of the distributed access node and the second apparatus comprises another one of the distributed unit of the distributed access node and the remote radio unit of the distributed access node.

9. A second apparatus comprising:
   at least one processor; and
   at least one memory including computer program code, the at least one memory and the computer program code being configured, with the at least one processor, to cause the second apparatus to perform:
   receiving a first protocol data unit (PDU) using enhanced common public radio interface (eCPRI) from a first apparatus, wherein the first PDU comprises a first header and, as payload, at least a first label for the first header, said first label comprising at least a compressed eCPRI header for enabling unique identification of the first header based on the first label;
   storing the first header and the first label for the first header to a learning index maintained in the at least one memory;
   receiving, following the storing, a second PDU having no header from the first apparatus, wherein the second PDU comprises a second label comprising at least the compressed eCPRI header; and
   retrieving, in response to the receiving of the second PDU, the first header for the second PDU or a part thereof from the learning index based on the second label, wherein
   the eCPRI associated with the first and second PDUs corresponds to eCPRI over Ethernet and the first and second PDUs are first and second Ethernet frames,
   the eCPRI associated with the first and second data packets corresponds to eCPRI over internet protocol version 4 (IPv4) or eCPRI over internet protocol version 6 (IPv6), the first and second PDUs are first and second IP data packets and the first and second labels further comprise an internet protocol (IP) version indication bit, a compressed network layer header and a compressed user datagram protocol (UDP) header, and
   the compressed UDP header comprises one or more of the following header fields in a compressed form: a source port and a destination port and the compressed network layer header comprises one or more of the following header fields in a compressed form:
   an IP source address and an IP destination address.

10. The second apparatus of claim 9, wherein the compressed eCPRI header comprises a concatenation indicator bit and one or more of the following header fields in a compressed form: an eCPRI message type, an eCPRI protocol revision and a PC_ID defined for an in-phase-quadrature (IQ) data message type.

11. The second apparatus according to claim 9, wherein the first label and the second label further comprise a compressed data link layer header comprising at least one or more of the following header fields in a compressed form: a virtual local area network tag protocol identifier (VLAN TPID), an EtherType value and medium access control (MAC) source and destination addresses.

12. The second apparatus according to claim 9, wherein the first and second labels comprise one or more learning indication bits indicating whether one or more header fields in full and in a compressed form are to be learned by the second apparatus based on a corresponding received PDU, the at least one memory and the computer program code being further configured, with the at least one processor, to cause the second apparatus to:

perform the storing of the first header and the first label in response to the one or more learning indication bits of the first label indicating that at least one of the one or more header fields are to be learned by the second apparatus; and perform the retrieving in response to the one or more learning indication bits of the second label indicating that no header fields are to be learned by the second apparatus.

13. The second apparatus according to claim 9, wherein the first and second labels comprise one or more compression indication bits indicating which header fields have been compressed, the at least one memory and the computer program code being configured, with the at least one processor, to cause the second apparatus to:

perform the retrieving in response to the one or more compression indication bits of the second label indicating that one or more header fields are compressed.

14. The second apparatus according to claim 9, wherein the first apparatus comprises one of a distributed unit of a distributed access node and a remote radio unit of the distributed access node and the second apparatus comprises another one of the distributed unit of the distributed access node and the remote radio unit of the distributed access node.

15. A method, comprising:

transmitting a first protocol data unit (PDU) using enhanced common public radio interface (eCPRI) to a second apparatus, wherein the first PDU comprises a first header and, as payload, at least a first label for the first header, said first label comprising at least a compressed eCPRI header; and transmitting, following the transmitting of the first PDU, a second PDU without a header using eCPRI to the second apparatus, wherein the second PDU corresponds to the first header and comprises a second label comprising at least said compressed eCPRI header for enabling accessing of the first header locally by the second apparatus, wherein the eCPRI corresponds to eCPRI over Ethernet and the first and second PDUs are first and second Ethernet frames, the eCPRI corresponds to eCPRI over internet protocol version 4 (IPv4) or eCPRI over internet protocol version 6 (IPv6), the first and second PDUs are first and second internet protocol (IP) data packets, the first and second labels further comprising an IP version indication bit, a compressed network layer header and a compressed user datagram protocol (UDP) header, and the compressed UDP header comprises one or more of the following header fields in a compressed form: a source port and a destination port and the compressed network layer header comprises one or more of the following header fields in a compressed form: an IP source address and an IP destination address.

16. A method, comprising:

receiving a first protocol data unit (PDU) using enhanced common public radio interface (eCPRI) from a first apparatus, wherein the first PDU comprises a first header and, as payload, at least a first label for the first header, said first label comprising at least a compressed eCPRI header;

storing the first header and the first label for the first header to a learning index maintained in at least one memory;

receiving, following the storing, a second PDU having no header from the first apparatus, wherein the second PDU comprises a second label comprising at least the compressed eCPRI header; and retrieving, in response to the receiving of the second PDU, the first header for the second PDU or a part thereof from the learning index based on the second label, wherein the eCPRI associated with the first and second PDUs corresponds to eCPRI over Ethernet and the first and second PDUs are first and second Ethernet frames, the eCPRI associated with the first and second data packets corresponds to eCPRI over internet protocol version 4 (IPv4) or eCPRI over internet protocol version 6 (IPv6), the first and second PDUs are first and second internet protocol (IP) data packets and the first and second labels further comprise an IP version indication bit, a compressed network layer header and a compressed user datagram protocol (UDP) header, and the compressed UDP header comprises one or more of the following header fields in a compressed form: a source port and a destination port and the compressed network layer header comprises one or more of the following header fields in a compressed form: an IP source address and an IP destination address.

17. A computer program embodied on a non-transitory computer-readable medium, said computer program comprising computer-readable instructions for causing an apparatus to perform at least:

transmitting a first protocol data unit (PDU) using enhanced common public radio interface (eCPRI) to a second apparatus, wherein the first PDU comprises a first header and, as payload, at least a first label for the first header, said first label comprising at least a compressed eCPRI header; and transmitting, following the transmitting of the first PDU, a second PDU without a header using eCPRI to the second apparatus, wherein the second PDU corresponds to the first header and comprises a second label comprising at least said compressed eCPRI header for enabling accessing of the first header locally by the second apparatus, wherein the eCPRI corresponds to eCPRI over Ethernet and the first and second PDUs are first and second Ethernet frames, the eCPRI corresponds to eCPRI over internet protocol version 4 (IPv4) or eCPRI over internet protocol version 6 (IPv6), the first and second PDUs are first and second internet protocol (IP) data packets, the first and second labels further comprising an IP version indication bit, a compressed network layer header and a compressed user datagram protocol (UDP) header, and the compressed UDP header comprises one or more of the following header fields in a compressed form: a source port and a destination port and the compressed network layer header comprises one or more of the following header fields in a compressed form: an IP source address and an IP destination address.

18. A computer program embodied on a non-transitory computer-readable medium, said computer program comprising computer-readable instructions for causing an apparatus to perform at least:

receiving a first protocol data unit (PDU) using enhanced common public radio interface (eCPRI) from a first apparatus, wherein the first PDU comprises a first header and, as payload, at least a first label for the first header, said first label comprising at least a compressed eCPRI header;

storing the first header and the first label for the first header to a learning index maintained in at least one memory;

receiving, following the storing, a second PDU having no header from the first apparatus, wherein the second PDU comprises a second label comprising at least the compressed eCPRI header; and retrieving, in response to the receiving of the second PDU, the first header for the second PDU or a part thereof from the learning index based on the second label, wherein the eCPRI associated with the first and second PDUs corresponds to eCPRI over Ethernet and the first and second PDUs are first and second Ethernet frames, the eCPRI associated with the first and second data packets corresponds to eCPRI over internet protocol version 4 (IPv4) or eCPRI over internet protocol version 6 (IPv6), the first and second PDUs are first and second internet protocol (IP) data packets and the first and second labels further comprise an IP version indication bit, a compressed network layer header and a compressed user datagram protocol (UDP) header, and the compressed UDP header comprises one or more of the following header fields in a compressed form: a source port and a destination port and the compressed network layer header comprises one or more of the following header fields in a compressed form: an IP source address and an IP destination address.

* * * * *